United States Patent
Akaho et al.

(10) Patent No.: US 12,497,052 B2
(45) Date of Patent: Dec. 16, 2025

(54) DRIVER STATE DETECTION DEVICE

(71) Applicants: TOYOTA JIDOSHA KABUSHIKI KAISHA, Aichi-ken (JP); AISIN CORPORATION, Aichi-ken (JP)

(72) Inventors: Daisuke Akaho, Nagoya (JP); Makoto Maehara, Nagoya (JP); Takashi Wakazono, Nagoya (JP); Kazuhiro Tomosue, Kariya (JP); Tsuyoshi Hoshino, Kariya (JP)

(73) Assignees: TOYOTA JIDOSHA KABUSHIKI KAISHA, Aichi-Ken (JP); AIIN CORPORATION, Aichi-Ken (JP)

( * ) Notice: Subject to any disclaimer, the term of this patent is extended or adjusted under 35 U.S.C. 154(b) by 52 days.

(21) Appl. No.: 18/415,649

(22) Filed: Jan. 18, 2024

(65) Prior Publication Data

US 2024/0246542 A1 Jul. 25, 2024

(30) Foreign Application Priority Data

Jan. 20, 2023 (JP) ................. 2023-007500

(51) Int. Cl.
*B60W 40/08* (2012.01)
*B60W 50/14* (2020.01)
(Continued)

(52) U.S. Cl.
CPC .......... *B60W 40/08* (2013.01); *B60W 50/14* (2013.01); *G06V 20/597* (2022.01);
(Continued)

(58) Field of Classification Search
CPC .............. B60W 40/08; B60W 50/14; B60W 2040/0818; B60W 2050/143; B60W 2050/146; B60W 2420/403; B60W 2520/10; B60W 2540/18; B60W 2540/225; B60W 2540/229; G06V 20/597; G06V 40/161; G06V 40/18
See application file for complete search history.

(56) References Cited

U.S. PATENT DOCUMENTS 9,925,832 B2 * 3/2018 Osugi ............... G06F 3/013
10,604,160 B2 * 3/2020 Matsumura ........ G06F 3/013
(Continued)

FOREIGN PATENT DOCUMENTS

JP 2019-087029 A 6/2019
JP 2019-087143 A 6/2019

*Primary Examiner* — Mohamed Barakat
(74) *Attorney, Agent, or Firm* — HAUPTMAN HAM, LLP

(57) ABSTRACT

A driver state detection device provided with a driver monitor camera configured to capture the face of a driver of a vehicle to generate a facial image of the driver and a control device. The control device is configured so as to detect the facial orientation or the line-of-sight direction of the driver based on the facial image, judge that the driver is driving distracted when the facial orientation or the line-of-sight direction of the driver is maintained for greater than or equal to a predetermined time period at the outside from the allowable range allowed as the facial orientation or the line-of-sight direction of the driver, and set the allowable range based on an operating parameter which is in a correlative relationship with steering operation of the steering wheel of the vehicle and the speed of the vehicle.

4 Claims, 6 Drawing Sheets

(51) Int. Cl.
*G06V 20/59* (2022.01)
*G06V 40/16* (2022.01)
*G06V 40/18* (2022.01)

(52) U.S. Cl.
CPC ............ *G06V 40/161* (2022.01); *G06V 40/18* (2022.01); *B60W 2040/0818* (2013.01); *B60W 2050/143* (2013.01); *B60W 2050/146* (2013.01); *B60W 2420/403* (2013.01); *B60W 2520/10* (2013.01); *B60W 2540/18* (2013.01); *B60W 2540/225* (2020.02); *B60W 2540/229* (2020.02)

(56) References Cited

U.S. PATENT DOCUMENTS

| | | | |
|---|---|---|---|
| 2014/0244096 A1* | 8/2014 | An | B60K 28/06 |
| | | | 701/25 |
| 2018/0201276 A1 | 7/2018 | Matsumura | |
| 2019/0135294 A1* | 5/2019 | Sato | G06V 10/24 |
| 2019/0135295 A1 | 5/2019 | Sato et al. | |
| 2020/0342274 A1* | 10/2020 | ElHattab | B60Q 9/00 |
| 2021/0081690 A1* | 3/2021 | Inagaki | G06V 40/161 |
| 2021/0339770 A1* | 11/2021 | Tamori | B60W 30/143 |
| 2022/0324457 A1* | 10/2022 | Arora | B60W 40/08 |

* cited by examiner

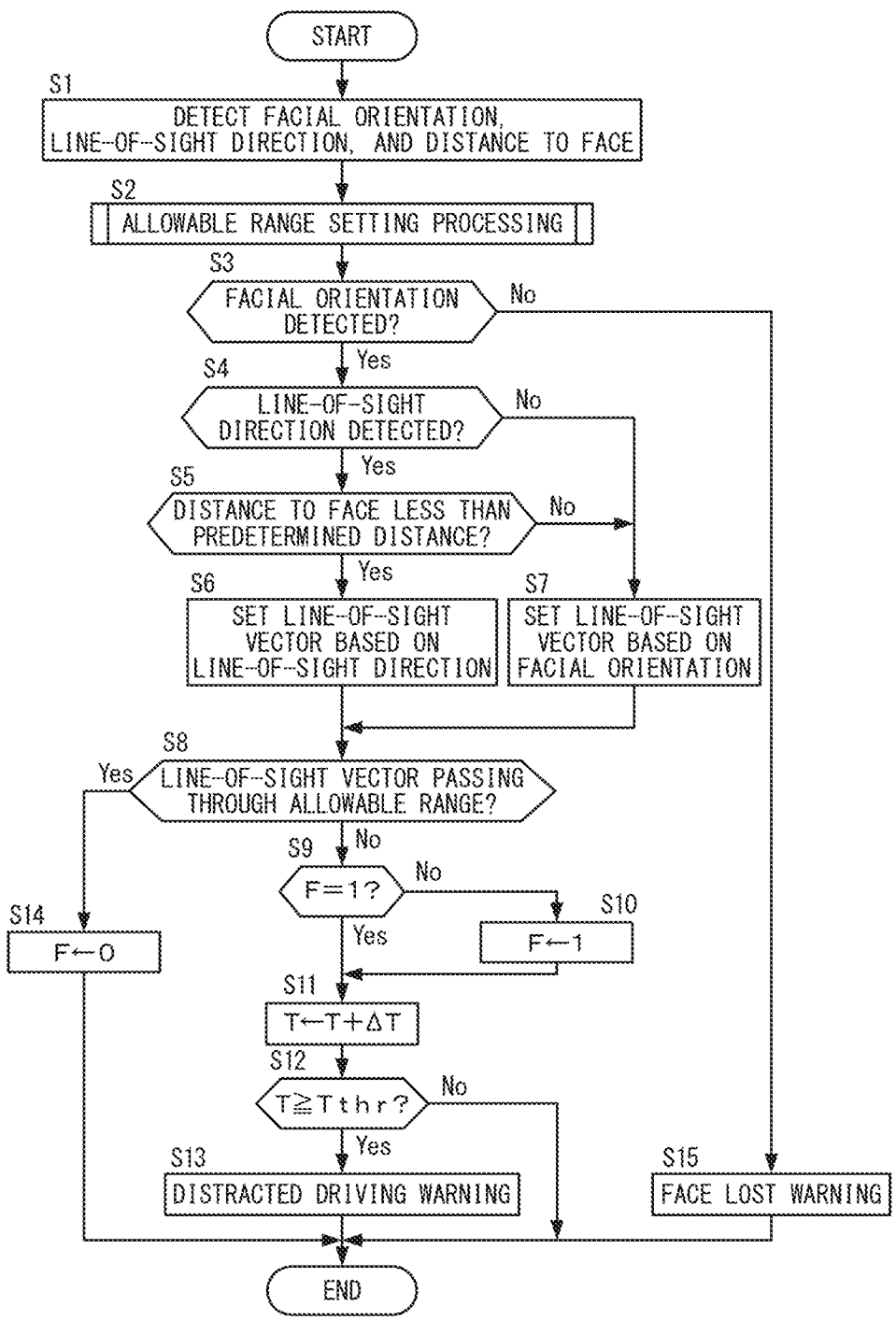

DRIVER STATE DETECTION DEVICE

RELATED APPLICATIONS

The present application claims priority of Japanese Patent Application No. 2023-007500 filed Jan. 20, 2023, the disclosure of which is hereby incorporated by reference herein in its entirety.

FIELD

The present disclosure relates to a driver state detection device.

BACKGROUND

PTL 1 (Japanese Unexamined Patent Publication No. 2019-87143) discloses a conventional driver state detection device configured to expand a left-right direction range allowed as a facial orientation or line of sight of a driver by exactly a predetermined amount in the direction of a curve if the shape of the road ahead is a curve and judge that the driver is driving distracted when the facial orientation of the driver or the line of sight is outside that range.

PTL 2 (Japanese Unexamined Patent Publication No. 2019-87029) discloses a conventional driver state detection device configured to expand a left-right direction range allowed as a facial orientation or line of sight of a driver by exactly a predetermined amount in the direction in which a lane is changed when there is a high possibility of a lane being changed such as when a turn signal is operated and judge that the driver is driving distracted when the facial orientation of the driver or the line of sight is outside that range.

SUMMARY

However, in the case of the conventional driver state detection device described in the above-mentioned PTL 1, when information on the shape of the road ahead cannot be acquired, the left-right direction range allowed as the facial orientation or line of sight of the driver cannot be expanded, so when operating the steering wheel to change the direction of advance of the vehicle to the left or right, it is liable to end up being judged that the driver is driving distracted despite the driver viewing the direction of the curve.

Further, in the case of the conventional driver state detection device described in the above-mentioned PTL 2, an operation such as operating a turn signal and sometimes not operating it triggers expansion of the left-right direction range allowed as the facial orientation or line of sight of the driver, so when the steering wheel is operated and the direction of advance of the vehicle is changed without such a triggering operation, it is liable to end up being judged that the driver is driving distracted despite the driver viewing the direction of advance (direction of adjoining lane at time of lane change).

The present disclosure was made focusing on such a problem and has as its object to keep from ending up judging that the driver is driving distracted regardless of not driving distracted.

To solve the above problem, the driver state detection device according to one aspect of the present disclosure is provided with a driver monitor camera configured to capture an appearance of a driver of a vehicle to generate an image of the driver appearance and a control device. The control device is configured so as to detect the facial orientation or the line-of-sight direction of the driver based on the image of the appearance, judge that the driver is driving distracted when the facial orientation or the line-of-sight direction of the driver is maintained for greater than or equal to a predetermined time period in a range at the outside from the allowable range allowed as the facial orientation or the line-of-sight direction of the driver, and set the allowable range based on an operating parameter which is in a correlative relationship with a steering operation of the steering wheel of the vehicle and the speed of the vehicle.

According to this aspect of the present disclosure, it is possible to expand the allowable range linked with a steering operation of the steering wheel—an essential operation performed when driving over a curved section. For this reason, it is possible to reliably expand the allowable range when driving through a curved section and keep from ending up judging that the driver is driving distracted despite not driving distracted.

BRIEF DESCRIPTION OF DRAWINGS

FIG. 2 is a flow chart explaining details of distracted driving judgment processing according to an embodiment of the present disclosure.

DESCRIPTION OF EMBODIMENTS

Figure 1:
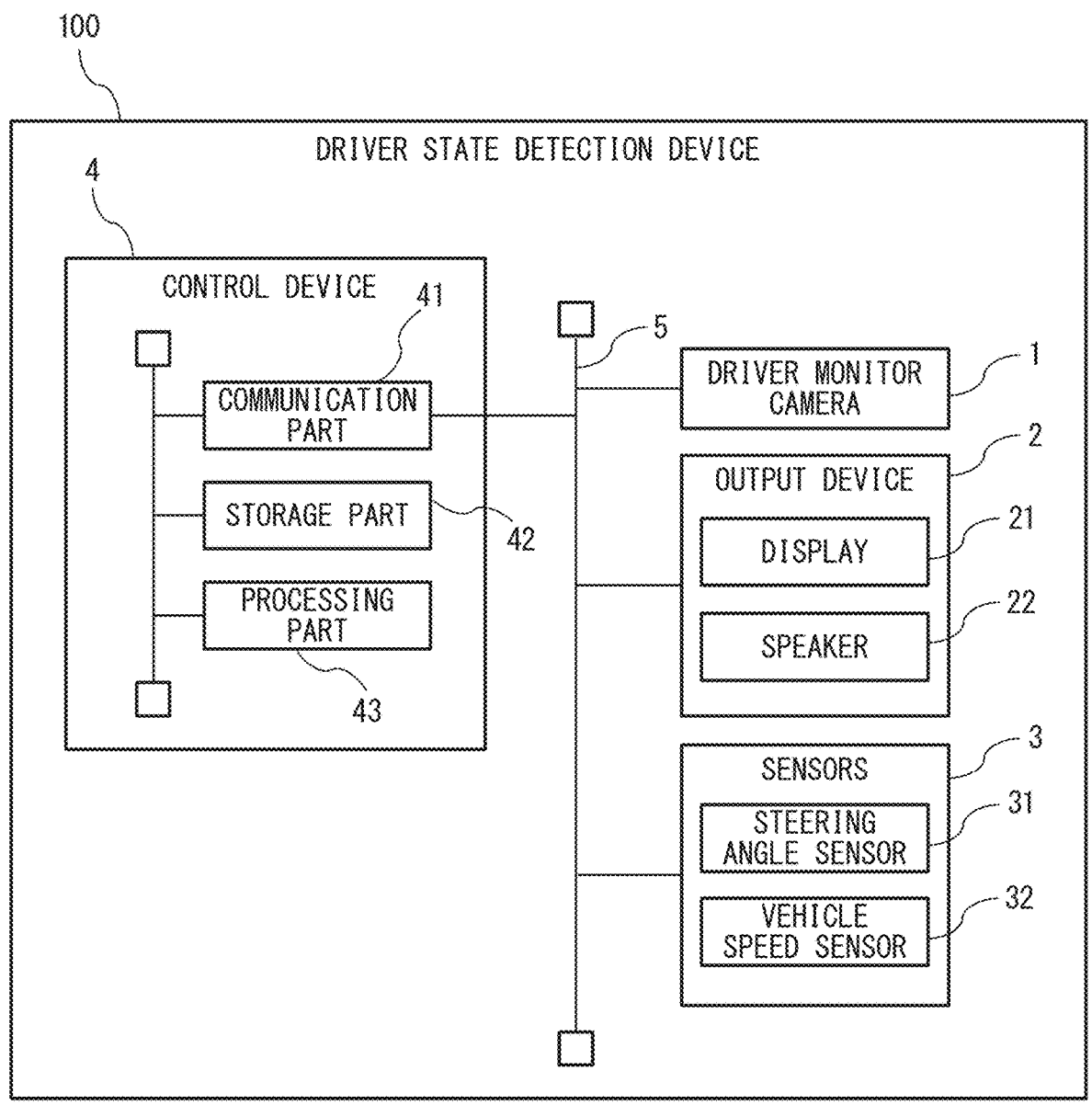
FIG. 1 is a schematic view of the constitution of a driver state detection device according to an embodiment of the present disclosure.

Below, referring to the drawings, an embodiment of the present disclosure will be explained in detail. Note that, in the following explanation, similar component elements are assigned the same reference notation.

FIG. 1 is a schematic view of the configuration of a driver state detection device 100 according to one embodiment of the present disclosure.

The driver state detection device 100 is a device mounted in a vehicle and detecting a state of a driver of the vehicle and is provided with a driver monitor camera 1, an output device 2, sensors 3, and a control device 4.

The driver monitor camera 1 captures the driver appearance, including his face, by a predetermined frame rate (for example, 10 Hz to 40 Hz) and generates an image of the driver appearance in which the driver appearance is captured. The driver monitor camera 1 sends the generated image of the driver appearance to the control device 4 each time generating the image of the driver appearance. The driver monitor camera 1 is, for example, attached to a steering column.

The output device 2 is a device for providing notifications to the driver through physical senses of the driver (for example, vision, hearing, touch, etc.) In the present embodiment, as the output device 2, a display 21 (for example, meter display, center display, heads up display, etc.)

arranged at a position which the driver can view and a speaker 22 outputting audio to the inside of the vehicle are provided. The display 21 displays information corresponding to a display signal output from the control device 4 (for example, text information or image information). The speaker 22 outputs audio corresponding to a display signal output from the control device 4.

The sensors 3 acquire data required for setting an allowable range allowed as the later explained facial orientation or line-of-sight direction of the driver. In the present embodiment, the sensors 3 include a steering angle sensor 31 for detecting a rotational angle of the steering wheel (below, referred to as the "steering angle") and a vehicle speed sensor 32 for detecting a vehicle speed.

The control device 4 is an ECU (electronic control unit) provided with a communication part 41, storage part 42, and processing part 43.

The communication part 41 is provided with an interface circuit for connecting the control device 4 to an internal vehicle network 5. The communication part 41 supplies to the processing part 43 the data received from the driver monitor camera 1 or sensors 3 through the internal vehicle network 5. Further, the communication part 41 sends to the output device 2 through the internal vehicle network 5 the display signal and audio signal output from the processing part 43.

The storage part 42 has an HDD (hard disk drive) or SSD (solid state drive), semiconductor memory, or other storage medium and stores the various computer programs, data, etc. used for processing at the processing part 43.

The processing part 43 has one or more CPUs (central processing unit) and their peripheral circuits and runs various types of computer programs stored in the storage part 42 to comprehensively control the overall operation of the driver state detection device 100, for example, is a processor. Giving one example of the processing which the processing part 43 performs, for example, the processing part 43 detects if the driver is driving distracted as the state of the driver and, when possible to judge that the driver is driving distracted, warns the driver through the output device 2. Below, the content of the distracted driving judgment processing which this processing part 43 and in turn the control device 4 perform will be explained with reference to FIG. 2 etc.

FIG. 2 is a flow chart explaining details of distracted driving judgment processing according to the present embodiment. The control device 4 performs this routine for example every time receiving an image of the driver appearance from the driver monitor camera 1.

At step S1, the control device 4 detects the facial orientation of the driver, the line-of-sight direction of the driver, and the distance from the driver monitor camera 1 to the face of the driver based on the image of the driver appearance received from the driver monitor camera 1.

The methods of detection of these are not particularly limited, but the control device 4 can, for example, analyze the image of the driver appearance to detect the portions of features of the face such as the eyes, nose, or mouth of the driver and compare the positions of these with 3D models of standard faces stored in the storage part 42 so as to detect the facial orientation of the 3D model which the positions of the portions of the features of the face best match as the facial orientation of the driver. Further, the control device 4 can, for example, analyze the image of the driver appearance to detect the position of the center of the pupil (that is, the position of point of view of the driver) serving as a moving point and the position of a purkinje image (corneal reflected image) serving as a reference point and detect the line-of-sight direction of the driver based on the positional relationship of the purkinje image and the center of the pupil (position of moving point with respect to reference point). Further, the control device 4, for example, analyzes the image of the driver appearance to detect the size of the face of the driver and compares this with the sizes of standard faces stored in the storage part 42 so as to detect the distance from the driver monitor camera 1 to the face of the driver. The image of the driver appearance can be analyzed by, for example, being input to a convolutional neural network (CNN) having a plurality of convolution layers connected in series from the input side to the output side.

At step S2, the control device 4 performs processing for setting the allowable range allowed as the facial orientation of the driver or the line-of-sight direction. Below, the allowable ranges will be explained referring to FIG. 3A, FIG. 3B, FIG. 4A and FIG. 4 and details of the processing for setting the allowable ranges will be explained referring to FIG. 5

Figure 3A:
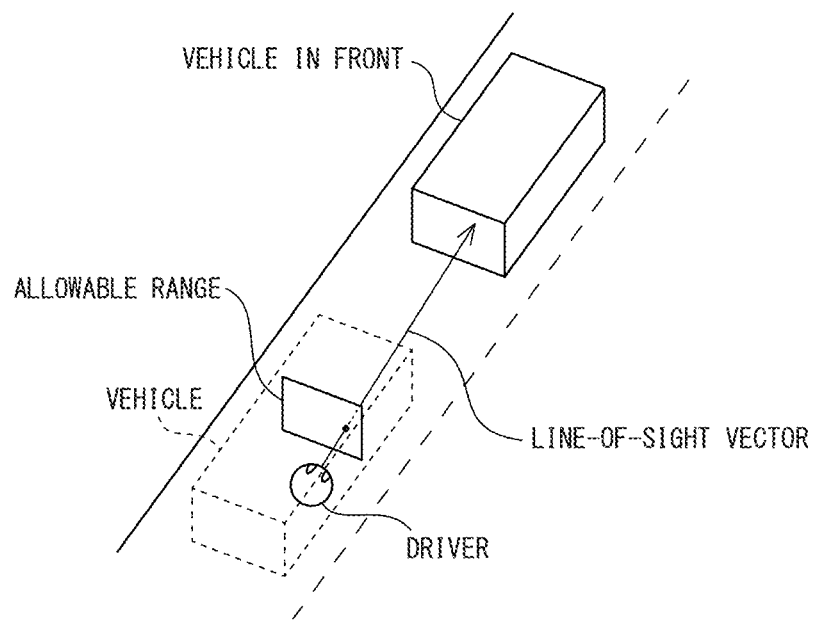
FIG. 3A is a view explaining an allowable range.
Figure 3B:
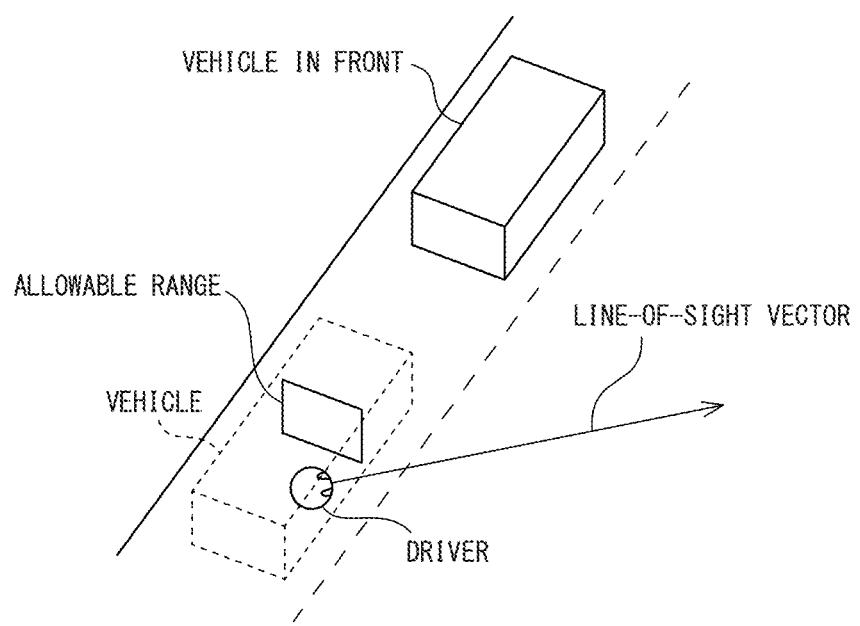
FIG. 3B is a view explaining an allowable range.

The control device 4 according to the present embodiment is configured, as shown in FIG. 3A, to judge that the driver is not driving distracted if a line-of-sight vector extending in the direction of the facial orientation of the driver or a line-of-sight vector extending from the position of the eyes of the driver (viewpoint position) toward the line-of-sight direction is passing an allowable range set at a predetermined position at the front in the direction of advance of the vehicle and having a predetermined height and width and, on the other hand, as shown in FIG. 3B, to judge that the driver is driving distracted if the line-of-sight vector is not passing the allowable range.

Figure 4A:
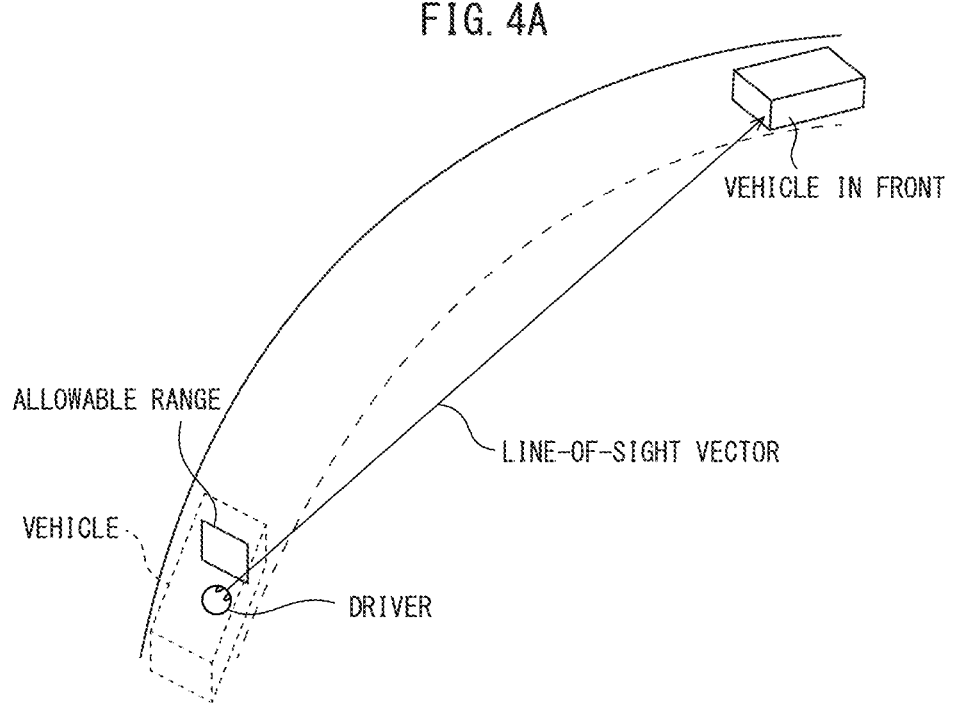
FIG. 4A is a view explaining an allowable range.
Figure 4B:
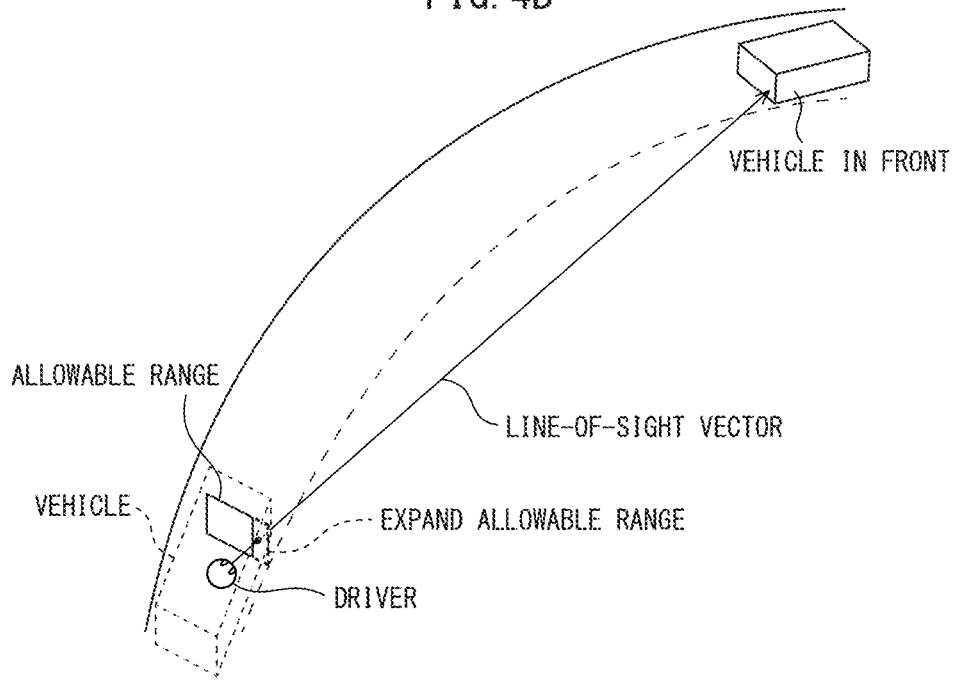
FIG. 4B is a view explaining an allowable range.

Here, as shown in FIG. 4A, when driving through a curved section (including left and right turn sections), compared with when driving through a straight section, the line-of-sight direction of the driver tends to move toward the side in the direction of the curve. For this reason, if the allowable range ends up being made the same between when driving through a straight section and when driving through a curved section, when driving through a curved section, the line-of-sight vector will easily not pass through the allowable range but pass through a range outside of It, and despite the driver viewing a vehicle in the front (despite not driving distracted), it is liable to be judged that the driver is driving distracted. For this reason, when driving through a curved section, as shown in FIG. 4B, it is desirable to expand the allowable range to the side in the direction of the curve (in FIG. 4B, the right side).

Therefore, in the present embodiment, it is made possible to expand the allowable angle based on a steering parameter in a correlative relationship with a steering operation of a steering wheel—an essential operation performed along with characteristics of a curved section (for example curvature etc.)

Figure 5:
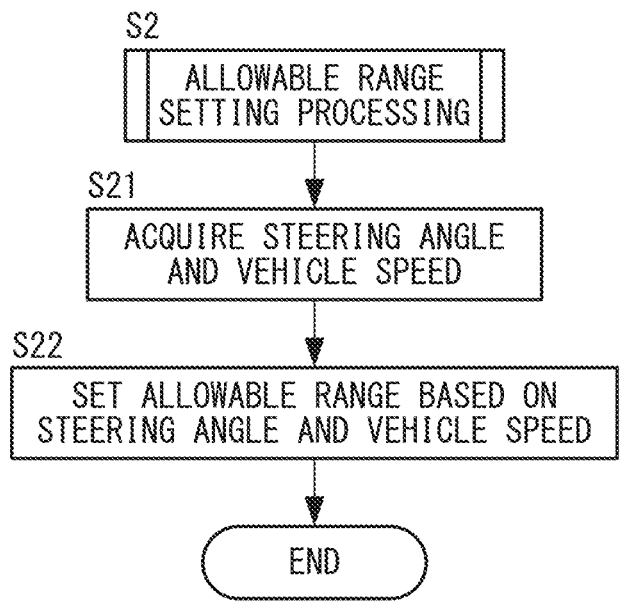
FIG. 5 is a flow chart explaining content of allowable range setting processing according to an embodiment of the present disclosure.

FIG. 5 is a flow chart explaining content of allowable range setting processing.

At step S21, the control device 4 acquires the steering angle, which is one of the steering parameters in a correlative relationship with the steering operation of the steering wheel, and the vehicle speed. As a steering parameter other than the steering angle, for example, the angle (turning angle) of the left and right front wheels (turning wheels) of the vehicle may be mentioned. Note that regarding the vehicle speed as well, it may be replaced with another parameter in a correlative relationship with the vehicle speed.

Figure 6:
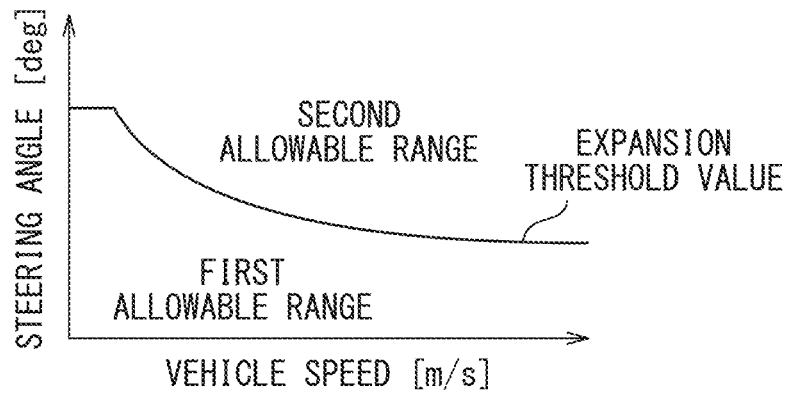
FIG. 6 is a view showing a map for setting an allowable range to a first allowable range or second allowable range based on a steering angle and vehicle speed.

At step S22, the control device 4 refers to the map of FIG. 6 set by experiments in advance etc. and sets the allowable range to the first allowable range or the second allowable range based on the steering angle and the vehicle speed. The first allowable range is made a range optimized by experiments in advance etc. as an allowable range when driving through a straight section. The second allowable range is made a range optimized by experiments in advance etc. as an allowable range when driving through a curved section, for example, is made an allowable range expanded by exactly a predetermined amount from the first allowable range to the side in the direction of the curve.

Figure 7:
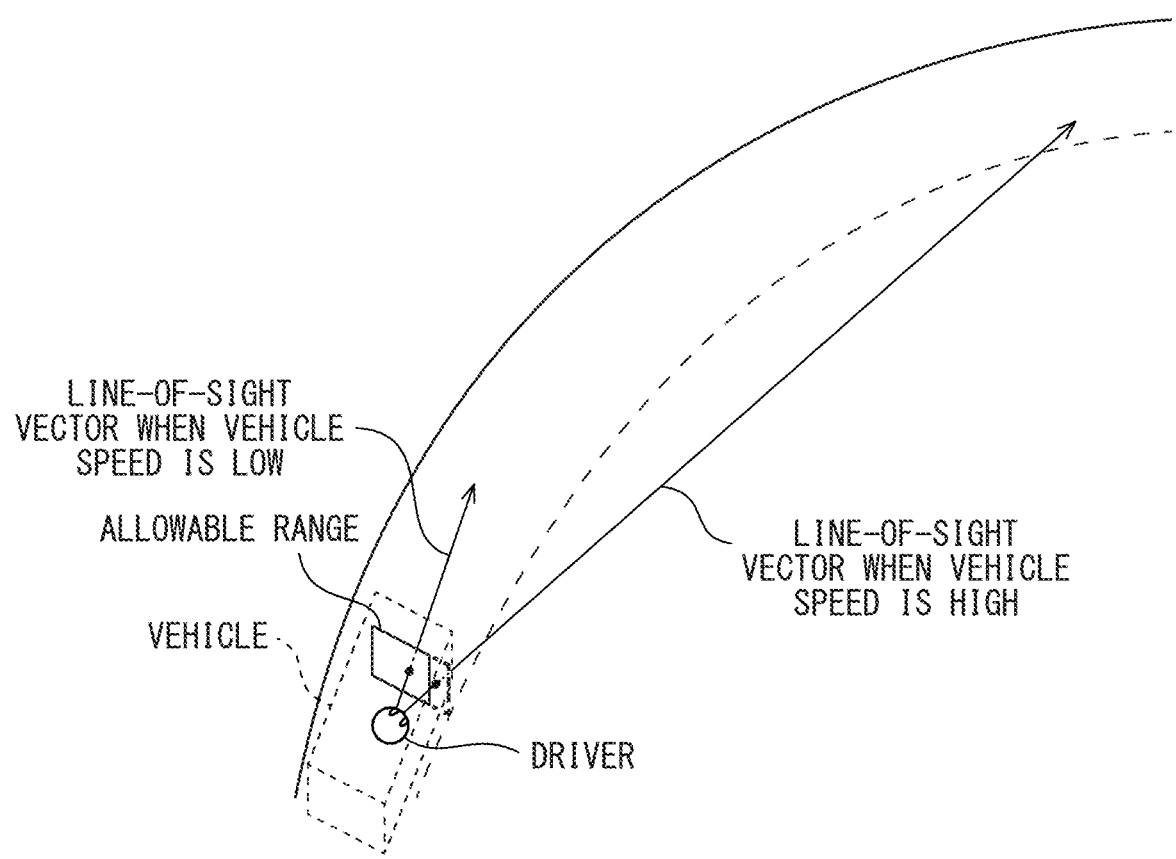
FIG. 7 is a view explaining there is a tendency for the driver to view farther ahead the higher the vehicle speed.

Note that, as shown in the map of FIG. 6, the allowable range is set to the first allowable range if the steering angle is less than the expansion threshold value set corresponding to the vehicle speed and is set to the second allowable range if it is the greater than or equal to the expansion threshold value. The expansion threshold value basically is set to become smaller the higher the vehicle speed. This is because, as shown in FIG. 7, a driver basically tends to look farther ahead the higher the vehicle speed. Therefore, the higher the vehicle speed, even if the curvature of the curve is small (that is, even if the steering angle is small), the easier it is for the line-of-sight vector to be directed to the side in the direction of the curve (that is, to the side in the direction of advance of the vehicle changed by a steering operation).

Note that, the map of FIG. 6 is in the end just one example and can be suitably set in accordance with the steering characteristics of the vehicle model and the handle shape (circular shape, D-shape, U-shape, etc.) etc.

Returning to FIG. 2, at step S3, the control device 4 judges whether it was possible to detect the facial orientation of the driver. If possible to detect the facial orientation of the driver, the control device 4 proceeds to the processing of step S4. On the other hand, if not possible to detect the facial orientation of the driver, the control device 4 proceeds to the processing of step S15.

At step S4, the control device 4 judges if it was possible to detect the line-of-sight direction of the driver. If possible to detect the line-of-sight direction of the driver, the control device 4 proceeds to the processing of step S5. On the other hand, if not possible to detect the line-of-sight direction of the driver, the control device 4 proceeds to the processing of step S7.

At step S5, considering the fact that if the distance from the driver monitor camera 1 to the face of the driver becomes greater than or equal to a predetermined distance, the precision of detection of the line-of-sight direction of the driver tends to deteriorate, if the distance from the driver monitor camera 1 to the face of the driver is less than a predetermined distance, the control device 4 proceeds to the processing of step S6. On the other hand, if the distance from the driver monitor camera 1 to the face of the driver is greater than or equal to a predetermined distance, the control device 4 proceeds to the processing of step S7.

At step S6, the control device 4 sets the line-of-sight vector based on the line-of-sight direction of the driver. In the present embodiment, the control device 4 sets a vector extending from the position of the eyes of the driver (viewpoint position) toward the line-of-sight direction as the line-of-sight vector.

At step S7, the control device 4 sets the line-of-sight vector based on the facial orientation of the driver. In the present embodiment, the control device 4 sets a vector extending toward the direction of the facial orientation of the driver as the line-of-sight vector.

At step S8, the control device 4 judges whether the line-of-sight vector is passing through the allowable range set at step S2. The control device 4 judges that the driver is not driving distracted and proceeds to the processing of step S14 if the line-of-sight vector is passing through the allowable range. On the other hand, the control device 4 judges that the driver is driving distracted and proceeds to the processing of step S9 if the line-of-sight vector is not passing through the allowable range.

At step S9, the control device 4 judges whether a continued distracted driving flag F has been set to 1. The continued distracted driving flag F is a flag set to 1 when starting distracted driving. The initial value of the continued distracted driving flag F is set to 0. If the continued distracted driving flag F is set to 1 (that is, if the driver is continuing to drive distracted from the previous processing), the control device 4 proceeds to the processing of step S11. On the other hand, if the continued distracted driving flag F is set to 0 (that is, if the driver driving distracted is detected the first time by the current processing), the control device 4 proceeds to the processing of step S10.

At step S10, the control device 4 sets the continued distracted driving flag F to 1.

At step S11, the control device 4 increases the continued distracted driving time period T by exactly a predetermined time period ΔT. In the present embodiment, the predetermined time period ΔT is a time period corresponding to one frame of the driver monitor camera 1.

At step S12, the control device 4 judges whether the continued distracted driving time period T has become greater than or equal to the distracted driving judgment time period Tthr. The distracted driving judgment time period Tthr can be made any value. At the present embodiment, it is made 2 seconds. If the continued distracted driving time period T is greater than or equal to the distracted driving judgment time period Tthr, the control device 4 proceeds to the processing of step S13. On the other hand, if the continued distracted driving time period T is less than the distracted driving judgment time period Tthr, the control device 4 ends the current processing.

At step S13, the control device 4 issues a distracted driving warning to the driver through the output device 2. The method and content of the distracted driving warning are not particularly limited. For example, the warning may be issued by an audio announcement that the driver is driving distracted, the warning may be issued by issuing a warning sound, the warning may be issued by displaying image information or text information on a display, or the warning may be issued by combining the same.

At step S14, the control device 4 sets the continued distracted driving flag F to 0.

At step S15, the control device 4 issues a warning through the output device 2 to the driver that his face cannot be recognized. The method and content of the distracted driving warning are also not particularly limited. For example, the warning may be issued by a method similar to a distracted driving warning.

The driver state detection device 100 according to the present embodiment explained above is provided with the driver monitor camera 1 capturing the appearance of a driver of a vehicle to generate an image of the driver appearance and the control device 4. The control device 4 is configured so as to detect the facial orientation or the line-of-sight direction of the driver based on the image of the appearance, judge that the driver is driving distracted when the facial orientation or the line-of-sight direction of the driver is maintained for greater than or equal to a predetermined time period in a range at the outside from the allowable range allowed as the facial orientation or the line-of-sight direction of the driver, and set the allowable range based on the steering angle of the steering wheel of the vehicle (steering parameter in which is in a correlative relationship with steering operation of the steering wheel) and the speed of the vehicle.

In this way, in the present embodiment, it is possible to expand the allowable range linked with a steering operation of the steering wheel—which is an essential operation performed in accordance with a characteristic of a curved section (for example, curvature etc.) when driving over a curved section. For this reason, it is possible to reliably expand the allowable range when driving through a curved section and keep from ending up judging that the driver is driving distracted despite not driving distracted.

Further, in the present embodiment, the control device 4 is configured so as to set the allowable range to a first allowable range if the steering angle of the steering wheel is less than an expansion threshold value set in accordance with a speed of the vehicle, set the allowable range to a second allowable range broader than the first allowable range if the steering angle of the steering wheel is greater than or equal to the expansion threshold value, and make the expansion threshold value smaller when the speed of the vehicle is high compared to when it is low.

As explained above, a driver basically tends to look farther ahead the higher the vehicle speed. Therefore, the higher the vehicle speed, even if the curvature of the curve is small (that is, even if the steering angle is small), the more the line-of-sight vector tends to be directed to the side in the direction of the curve (that is, the side in direction of advance of the vehicle changed by the steering operation). Therefore, when the speed of the vehicle is high, compared to when it is low, it is possible to make the expansion threshold value smaller to thereby suitably expand the allowable range in accordance with the speed of the vehicle.

Further, in the present embodiment, the control device 4 is configured so that, when setting the allowable range to the second allowable range, the range at the side in the direction of advance of the vehicle changed by the steering operation is expanded from the first allowable range by exactly a predetermined amount, so it is possible to suitably expand the allowable range.

Further, the driver state detection device 100 according to the present embodiment is further provided with an output device 2 for providing notifications to the driver. The control device 4 is configured so as to provide notification regarding distracted driving through the output device 2 to the driver when it is judged that the driver is driving distracted, so it is possible to make the driver not continue driving distracted.

Above, an embodiment of the present disclosure was explained, but the above embodiment only shows part of the examples of application of the present disclosure and is not intended to limit the technical scope of the present disclosure to the specific constitution of the embodiment.

For example, in the above embodiment, the computer program (distracted driving judgment processing) run at the control device 4 may be provided in a computer readable portable storage medium such as a magnetic recording medium or optical recording medium.

The invention claimed is:

1. A driver state detection device comprising:
a driver monitor camera configured to capture the appearance of a driver of a vehicle to generate an image of the driver appearance; and
a control device, wherein
the control device is configured to:
    detect a facial orientation or a line-of-sight direction of the driver based on the image of the appearance;
    judge that the driver is driving distracted when the facial orientation or the line-of-sight direction of the driver is maintained for greater than or equal to a predetermined time period in a range at an outside from an allowable range allowed as the facial orientation or the line-of-sight direction of the driver;
    set the allowable range based on an operating parameter which is in a correlative relationship with steering operation of a steering wheel of the vehicle and a speed of the vehicle;
    set the allowable range to a first allowable range if the steering parameter is less than an expansion threshold value set in accordance with the speed of the vehicle;
    set the allowable range to a second allowable range broader than the first allowable range if the steering parameter is greater than or equal to the expansion threshold value; and
    decrease a magnitude of the expansion threshold value smaller as the speed of the vehicle increases.

2. The driver state detection device according to claim 1, wherein
the control device is configured to make a range at a side in a direction of advance of the vehicle changed by the steering operation broader than the first allowable range by exactly a predetermined amount when setting the allowable range to the second allowable range.

3. The driver state detection device according to claim 1, wherein
the driver state detection device further comprises an output device configured to provide notifications to the driver, and
the control device is configured to provide notifications relating to distracted driving to the driver through the output device when it is judged that the driver is driving distracted.

4. The driver state detection device according to claim 1, wherein
the steering parameter is a steering angle of a steering wheel or a turning angle of turning wheels of the vehicle.

* * * * *